April 22, 1969  G. B. STONE ET AL  3,439,964
UNIVERSAL BEARING BLOCK
Filed Feb. 21, 1967  Sheet 2 of 2
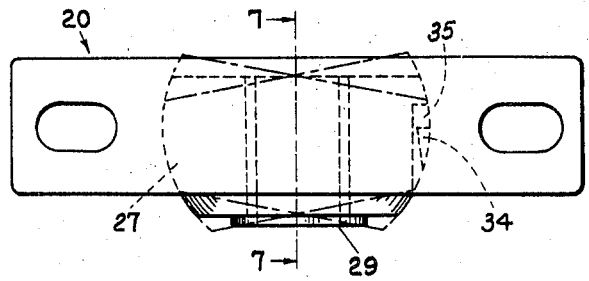
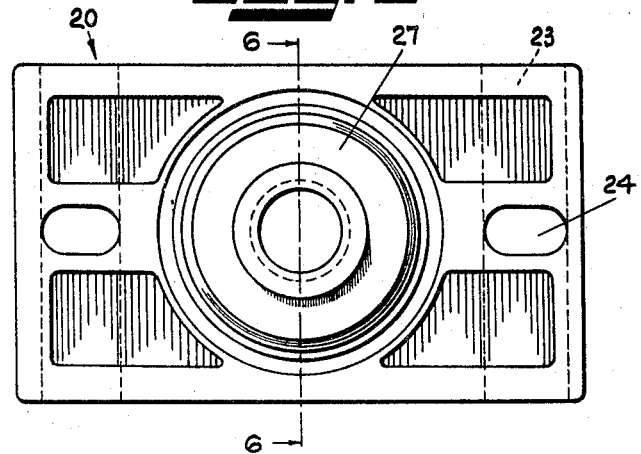
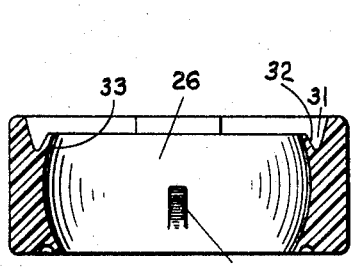
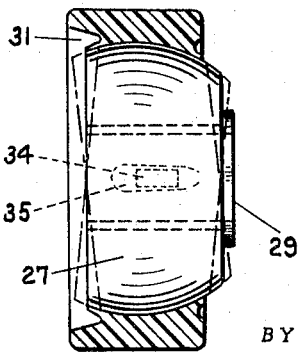
INVENTOR.
GUTHRIE B. STONE
ALAN J. STONE
BY
Albert Q. Mahassel
ATTORNEY United States Patent Office 3,439,964
Patented Apr. 22, 1969

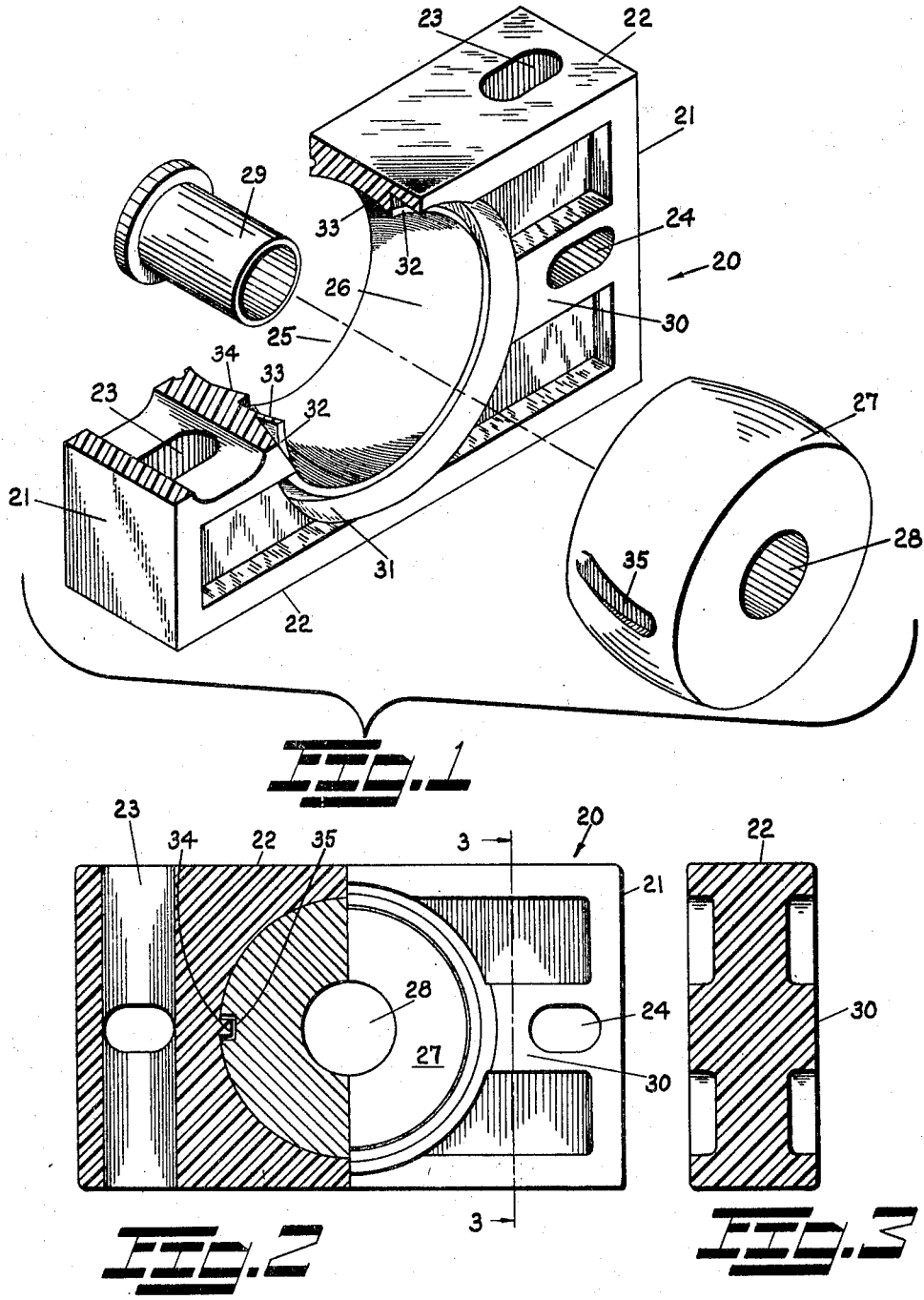

3,439,964
UNIVERSAL BEARING BLOCK
Guthrie B. Stone, Honeoye, and Alan J. Stone, Canandaigua, N.Y., assignors, by mesne assignments, to Murray Company of Texas, Inc., a corporation of Delaware
Filed Feb. 21, 1967, Ser. No. 617,579
Int. Cl. F16c 9/06, 23/00
U.S. Cl. 308—72                            1 Claim

ABSTRACT OF THE DISCLOSURE

A unitary bearing block with a spherical interior chamber for receiving and retaining a one-piece ball-type bearing. An annular groove encircles a side opening to the chamber and has a flexible iner edge to permit insertion of the bearing by means of pressure.

Background of the invention (1) This invention pertains to self-aligning rotary bearings of the radial type. A parallel-sided housing supports a bearing movable therein which has been inserted as a single unit by force fit.

(2) Various bearing support means have been suggested in the past which allow angular movement to compensate for shaft variations. Generally, pillow blocks or flange blocks of this type have had a split housing and ball arrangement similar to that shown in U.S. Patent 2,827,340. Where one-piece housing and sleeves have been disclosed, as in the U.S. Patent 2,345,564, accurately formed entry slots are required in which the overall opening equals the sleeve diameter. In addition it was often necessary to slit the inner-sleeve to obtain proper seating within the housing. The instant invention overcomes the inherent disadvantages of these two types by providing a bearing block which may be molded as a single unit and into which the bearing may be easily pressed.

Summary

It is a general object of the invention to provide a bearing block of one-piece molded construction for use as a pillow block or a flange block which shall allow savings in both initial cost and in assembling time over those previously known.

It is a further object of the invention to provide a bearing block having a built-in flexibility sufficient to allow insertion of a sphere-shaped inner bearing.

It is a further object of the invention to provide a bearing block having an integrally formed dust seal for protecting the bearing against foreign matter.

It is a still further object to provide a formation for a bearing block by which multiple units may be combined by stacking or in tandem.

These and other objects will become apparent as further details are disclosed.

In the preferred embodiment a bearing housing is shown as a single unit having parallel opposing sides and a centrally disposed spherical chamber extending laterally therethrough. An annular groove is formed upon one face of the housing and encircles the opening to the spherical chamber. The groove provides flexibility to allow a ball-type bearing to be inserted by pressure into the chamber. The inner edge of the groove provides an adequate seal with the surface of the bearing to exclude any dirt or moisture. The invention will appear more clearly from the following detailed description when taken in connection with the accompanying drawings.

Brief description of the drawings

FIG. 1 is an exploded perspective view of the bearing as seen from one side and slightly above;

FIG. 2 is an elevation of the side of the block shown in FIG. 1 with one half shown sectionally as taken on a vertical center line;

FIG. 3 is a section taken on line 3—3 in FIG. 2;

FIG. 4 is an elevation of the reverse side from FIG. 2;

FIG. 5 is a plan view of the device shown in FIG. 4;

FIG. 6 is a section taken on line 6—6 in FIG. 4; and

FIG. 7 is a section taken on line 7—7 in FIG. 5 with the bearing removed.

Description of the preferred embodiment

Now referring to the drawings, a rectangular-parallelepipedal housing generally designated 20 has two parallel identical ends 21 and two longer parallel surfaces 22 which are usable interchangeably as the top or bottom. The housing is preferably molded as one piece of a plastic having strength and resiliency. Bolt holes at either end of the housing for mounting purposes may be elongated to provide adjustability as shown at 23 and 24.

A round aperture 25 with a spherical internal circumferential wall 26 extends through the housing. A bearing sleeve 27 of any low-friction material is formed as a truncated sphere having a diameter closely matching that of the wall 26. A bore 28 through the center of the sleeve 27 will journal a rotating shaft (not shown) or may receive a reducing adapter 29 to increase the range of shaft sizes. The sleeve 27, when in position within the housing, will fit closely against the wall 26; yet angular movement will be afforded to compensate for any shaft misalignment.

The insertion of the sleeve 27 is made through the side 30 of the housing 20 and, in addition to the resiliency of the plastic material, further expansible means are provided. A V-shaped groove 31 encircles the aperture 25 near its edge on the side 30. The groove 31 is concentric with the aperture 25 and forms a lip 32 at its inner edge (FIGS. 1 and 7). The portion 33 of the lip 32 adjacent the aperture 25 defines a spherical surface coextensive with the wall 26. The lip portion 33 will retain a close contact with the sleeve 27 and seal out any dust or other foreign material and serve as an oil seal should such be desirable. The lip 32 is recessed within the face of the side 30 to permit angular movement by the sleeve 27 (FIG. 6) without any interference when used as a flange block.

To prevent rotation of the sleeve 27 within the housing 20, a built-in key and keyway cooperate loosely by permitting only angular motion to the sleeve. An integrally formed projecting key 34 (FIGS. 1 and 5) upon the wall 26 will be received into an oversize keyway 35 in the spherical surface of the sleeve 27.

With the instant invention, application of the bearing sleeve to the housing is a simple matter. After the keyway 35 is aligned with the key 34, pressure upon the sleeve 27 will stretch the lip 32 forcing that material into the groove 31. After the sleeve has passed the lip 32 will retract to its original configuration.

The one-piece housing disclosed herein is suitable for manufacture in large quantities and is useable in numerous types of installations, such as a pillow block, flange block, or a take-up block. Any type of bearing material may be used for the sleeve and is easily inserted into the housing.

We claim:

1. A self-aligning rotary bearing device comprising
   (a) a spherical sleeve having a cylindrical bearing surface extending diametrically therethrough,
   (b) a housing formed as a molded unit with rectangular parallelepipedal conformation having a lateral aperture defining a spherical chamber retaining said sleeve in mutual contact,
(c) said housing having one side thereof containing an annular groove encircling said aperture concentrically,
(d) a resilient lip member defining the inner periphery of said groove, said lip member having a spherical inner surface coextensive with said spherical chamber and flexibly movable into and out of said groove permitting the insertion by force of said sleeve to said housing,
(e) said lip member being recessed within the surface of said housing allowing said sleeve to pivot angularly within the dimensions of said one side, and
(f) a projecting key integrally formed within said spherical chamber, with said sleeve having a keyway disposed to engage said projecting key for restraining said sleeve against rotation.

References Cited

UNITED STATES PATENTS

| | | | |
|---|---|---|---|
| 2,307,874 | 1/1943 | Bilde | 308—72 |
| 2,382,773 | 8/1945 | Chambers et al. | 308—72 |
| 2,626,839 | 1/1953 | Creson et al. | 308—36.1 |
| 2,827,340 | 3/1958 | Johnson | 308—72 |
| 2,881,032 | 4/1959 | Connolly | 308—36.1 |
| 3,108,830 | 10/1963 | Fierstine | 308—36.1 |
| 3,115,375 | 12/1963 | Haller | 308—72 |
| 3,162,471 | 12/1964 | Mazziotti | 308—36.1 |
| 3,278,203 | 10/1966 | Snyder | 308—72 |

FOREIGN PATENTS 562,608    7/1944    Great Britain.

MARTIN P. SCHWADRON, *Primary Examiner.*
LUCIUS L. JOHNSON, *Assistant Examiner.*